(12) United States Patent
Kashanian

(10) Patent No.: US 9,723,092 B1
(45) Date of Patent: Aug. 1, 2017

(54) UNIVERSAL DATA REMOTE APPLICATION FRAMEWORK

(75) Inventor: Nematolah Kashanian, Hackensack, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 13/081,858

(22) Filed: Apr. 7, 2011

(51) Int. Cl.
  *H04L 29/08* (2006.01)
  *H04W 48/00* (2009.01)
  *H04L 29/06* (2006.01)
  *H04M 15/00* (2006.01)
  *H04W 48/02* (2009.01)

(52) U.S. Cl.
  CPC .............. *H04L 67/28* (2013.01); *H04L 63/10* (2013.01); *H04L 63/102* (2013.01); *H04M 15/00* (2013.01); *H04W 48/00* (2013.01); *H04W 48/02* (2013.01)
  USPC .......... 709/223; 709/217; 709/225; 709/226; 348/211.2; 348/211.9; 455/405

(58) Field of Classification Search
  CPC ..... H04M 15/00; H04M 15/88; H04L 47/824; H04L 47/826; H04L 41/0893; H04L 41/0896; H04L 67/28; H04L 63/10; H04L 63/102; H04W 48/00; H04W 48/02
  USPC ....... 709/217–219, 224, 225, 226, 229, 203, 709/223; 455/405; 348/211.99, 211.2, 348/211.4, 211.9; 726/4
  See application file for complete search history.

(56) References Cited

U.S. PATENT DOCUMENTS

| | | | |
|---|---|---|---|
| 6,002,669 A | 12/1999 | White | |
| 6,373,929 B1 | 4/2002 | Johnson et al. | |
| 6,400,903 B1 * | 6/2002 | Conoval | 396/56 |
| 6,556,241 B1 * | 4/2003 | Yoshimura et al. | 348/211.99 |
| 6,947,723 B1 | 9/2005 | Gurnani et al. | |
| 6,973,038 B1 | 12/2005 | Narendran | |
| 7,043,225 B1 | 5/2006 | Patel et al. | |
| 7,068,306 B2 * | 6/2006 | Pyle et al. | 348/211.9 |
| 7,206,569 B2 * | 4/2007 | Erskine et al. | 455/405 |
| 7,280,818 B2 * | 10/2007 | Clayton | 455/405 |
| 7,400,891 B2 * | 7/2008 | Aaron | 455/410 |
| 7,528,863 B2 * | 5/2009 | Koshikawa | 348/211.4 |
| 7,650,137 B2 | 1/2010 | Jobs et al. | |
| 7,818,438 B2 * | 10/2010 | Hachimura | 709/225 |
| 8,112,062 B2 * | 2/2012 | Pattabiraman | 455/405 |

(Continued)

FOREIGN PATENT DOCUMENTS

| WO | WO-2005/081735 | 9/2005 |
|---|---|---|
| WO | WO 2008/019334 A2 | 2/2008 |

OTHER PUBLICATIONS

"NetZero and LookSmart Team Up to Create Co-Branded Site for NetZero Subscribers", San Francisco, CA, May 4, 1999.

*Primary Examiner* — Ramy M Osman

(57) ABSTRACT

A system is presented that enables the control and/or monitoring of an electronic device by a remote terminal via a wireless network. The system includes a remote terminal from which a user accesses an application for controlling and monitoring the electronic device. The application is processed through an application program interface to configure the application for the remote terminal. The configured application is then accessible through a network communication for execution by the remote terminal. The server or system offering the configured application may also act as a proxy between the user terminal and the electronic device, for wireless monitoring or control of the electronic device while the user terminal executes the application.

18 Claims, 4 Drawing Sheets

(56) References Cited

U.S. PATENT DOCUMENTS

| | | | |
|---|---|---|---|
| 8,140,364 B2 | 3/2012 | Kannan et al. | |
| 8,194,581 B1 | 6/2012 | Schroeder et al. | |
| 8,224,983 B2 * | 7/2012 | Ta et al. | 709/226 |
| 8,281,016 B2 | 10/2012 | Nomura et al. | |
| 8,347,362 B2 * | 1/2013 | Cai et al. | 455/406 |
| 8,400,925 B2 | 3/2013 | Wurm et al. | |
| 8,434,126 B1 * | 4/2013 | Schepis | H04N 21/44222 726/1 |
| 8,566,239 B2 | 10/2013 | Arthur et al. | |
| 8,571,538 B2 * | 10/2013 | Sprigg | H04L 63/102 455/410 |
| 8,718,633 B2 * | 5/2014 | Sprigg | H04W 12/08 455/411 |
| 8,745,191 B2 | 6/2014 | Raleigh et al. | |
| 9,043,455 B1 * | 5/2015 | Kashanian | H04L 67/28 370/230 |
| 9,049,589 B2 * | 6/2015 | Zalmanovitch | H04M 15/83 |
| 9,124,436 B2 * | 9/2015 | Kashanian | H04L 12/1417 |
| 9,131,408 B1 * | 9/2015 | Falsafi | H04W 48/18 |
| 9,253,663 B2 * | 2/2016 | Raleigh | H04W 24/02 |
| 2002/0075844 A1 | 6/2002 | Hagen | |
| 2002/0138398 A1 | 9/2002 | Kalin et al. | |
| 2002/0141420 A1 | 10/2002 | Sugiarto | |
| 2003/0071902 A1 * | 4/2003 | Allen et al. | 348/211.11 |
| 2004/0106393 A1 | 6/2004 | Chowdhury et al. | |
| 2004/0137874 A1 | 7/2004 | Veerepalli et al. | |
| 2005/0111036 A1 * | 5/2005 | Takasaki et al. | 358/1.15 |
| 2005/0198319 A1 * | 9/2005 | Chan | H04L 63/08 709/228 |
| 2005/0282559 A1 | 12/2005 | Erskine et al. | |
| 2006/0045245 A1 * | 3/2006 | Aaron | H04L 43/0876 379/111 |
| 2006/0259629 A1 | 11/2006 | Usmani et al. | |
| 2006/0287921 A1 | 12/2006 | Defries | |
| 2006/0293057 A1 * | 12/2006 | Mazerski | H04W 12/08 455/445 |
| 2007/0002129 A1 * | 1/2007 | Benco et al. | 348/14.02 |
| 2007/0019670 A1 | 1/2007 | Falardeau | |
| 2007/0230910 A1 * | 10/2007 | Welch et al. | 386/96 |
| 2007/0271513 A1 * | 11/2007 | Andren | 715/703 |
| 2007/0298787 A1 | 12/2007 | Matharu | |
| 2008/0159212 A1 * | 7/2008 | Zhang et al. | 370/329 |
| 2008/0172721 A1 * | 7/2008 | Noh | H04L 63/0815 726/4 |
| 2008/0201225 A1 | 8/2008 | Maharajh et al. | |
| 2008/0207216 A1 * | 8/2008 | Usuda et al. | 455/453 |
| 2009/0068980 A1 | 3/2009 | Creswell et al. | |
| 2009/0153686 A1 * | 6/2009 | Huang | 348/211.2 |
| 2009/0172796 A1 | 7/2009 | Wood et al. | |
| 2009/0182599 A1 | 7/2009 | Kannan et al. | |
| 2009/0182859 A1 | 7/2009 | Motoyama | |
| 2010/0008337 A1 | 1/2010 | Bajko | |
| 2010/0017506 A1 | 1/2010 | Fadell | |
| 2010/0041365 A1 | 2/2010 | Lott et al. | |
| 2010/0056130 A1 | 3/2010 | Louch et al. | |
| 2010/0088620 A1 * | 4/2010 | Tran | H04N 7/163 715/764 |
| 2010/0182438 A1 * | 7/2010 | Mohammed | 348/207.11 |
| 2010/0188975 A1 | 7/2010 | Raleigh | |
| 2010/0188990 A1 | 7/2010 | Raleigh | |
| 2010/0188991 A1 | 7/2010 | Raleigh | |
| 2010/0188992 A1 | 7/2010 | Raleigh | |
| 2010/0188993 A1 | 7/2010 | Raleigh | |
| 2010/0188994 A1 | 7/2010 | Raleigh | |
| 2010/0188995 A1 | 7/2010 | Raleigh | |
| 2010/0190470 A1 | 7/2010 | Raleigh | |
| 2010/0191575 A1 | 7/2010 | Raleigh | |
| 2010/0191576 A1 | 7/2010 | Raleigh | |
| 2010/0191604 A1 | 7/2010 | Raleigh | |
| 2010/0191612 A1 | 7/2010 | Raleigh | |
| 2010/0191613 A1 | 7/2010 | Raleigh | |
| 2010/0191846 A1 | 7/2010 | Raleigh | |
| 2010/0191847 A1 | 7/2010 | Raleigh | |
| 2010/0192120 A1 | 7/2010 | Raleigh | |
| 2010/0192170 A1 | 7/2010 | Raleigh | |
| 2010/0192207 A1 | 7/2010 | Raleigh | |
| 2010/0192212 A1 | 7/2010 | Raleigh | |
| 2010/0195503 A1 | 8/2010 | Raleigh | |
| 2010/0197266 A1 | 8/2010 | Raleigh | |
| 2010/0197267 A1 | 8/2010 | Raleigh | |
| 2010/0197268 A1 | 8/2010 | Raleigh | |
| 2010/0198698 A1 | 8/2010 | Raleigh | |
| 2010/0198939 A1 | 8/2010 | Raleigh | |
| 2010/0199325 A1 | 8/2010 | Raleigh | |
| 2010/0205301 A1 | 8/2010 | Ansari et al. | |
| 2010/0229248 A1 | 9/2010 | Glave | |
| 2011/0019566 A1 | 1/2011 | Leemet et al. | |
| 2011/0058052 A1 * | 3/2011 | Bolton et al. | 348/211.99 |
| 2011/0065419 A1 * | 3/2011 | Book | H04L 63/102 455/411 |
| 2011/0078767 A1 * | 3/2011 | Cai et al. | 726/4 |
| 2011/0115932 A1 * | 5/2011 | Shin et al. | 348/211.4 |
| 2011/0125609 A1 | 5/2011 | Burger et al. | |
| 2012/0155296 A1 * | 6/2012 | Kashanian | H04M 15/80 370/252 |
| 2012/0215911 A1 | 8/2012 | Raleigh et al. | |
| 2012/0330792 A1 * | 12/2012 | Kashanian | 705/27.1 |
| 2013/0166390 A1 | 6/2013 | Blow et al. | |

* cited by examiner

UNIVERSAL DATA REMOTE APPLICATION FRAMEWORK

TECHNICAL FIELD

The present subject matter relates to techniques and equipment that allow utilization of a mobile network to configure, monitor and/or control functionality with respect to one or more electronic devices from a terminal that is remote to the electronic device.

BACKGROUND

In recent years, electronic devices such as digital cameras, portable music players and electronic readers (eReaders) have become popular, due in part to improvements in memory storage capacity and faster processors incorporated in these devices. The popularity of mobile devices such as mobile phones, which provide a subscriber of a mobile service provider (e.g., Verizon Wireless™) with means to communicate with others using voice, SMS, electronic mail services, and Internet data services has also increased. Mobile devices with Internet data service also allow subscribers the ability to browse web pages, use web applications, make purchases, and share information using their mobile devices.

This increased access to the Internet and web-based applications has also increased the popularity of quickly viewing information such as pictures, messages and other information via mobile devices with Internet data service. However, users of mobile devices have been limited to being able to post and share information using their mobile devices to information that is stored on the memory of the mobile device and not information that is stored on other electronic devices. For example, if a digital camera user would like to share a picture taken from the digital camera, the user is required to connect the digital camera to a computer having the appropriate input and software for the camera, download the picture from the memory of the camera to the memory of the computer, connect the computer to the Internet, due to the electronic device lacking a keyboard or other versatile input form, and post the picture to a website for viewing.

In this scenario, the user may need to use a computer with the appropriate input and software in order to connect to the Internet and post pictures. This multi-step procedure may result in a delay in sharing information until the user is near a computer with the appropriate inputs and software. Therefore, there is a need to allow a user to remotely access his/her electronic device such as, for example, a camera to upload photos on the Internet.

Furthermore, with the increased mobile network data usage, there is an increased need to monitor and adjust data usage and wireless network data plans.

In particular, there is a need for a simple and secure manner for allowing the user of the electronic device to monitor data usage, configure, and/or control the electronic device from a remote terminal via wireless data communication with the electronic device.

SUMMARY

To improve over the art and address one or more of the needs outlined above, a remote terminal is used to control an electronic device having embedded data communication capabilities and to enable the user of the electronic device to monitor data usage, configure and control the electronic device from a remote terminal via wireless data communication with the electronic device In one general aspect, the instant application describes a system, including a computer having a processor, a communication interface and a memory. Programming is stored in the memory for execution by the processor. The programming configures the system to implement functions. These functions include, functions to access through a network communication, an application for monitoring and controlling an electronic device having embedded wireless data communication capabilities.

The received application is displayed on a user terminal designated as a universal data remote (UDR) with respect to the electronic device for execution to enable the user to remotely monitor, and/or control the electronic device from the user UDR. The above general concept may include one or more of the following features. For example, the programming may configure the system to implement function to control data usage of the electronic device based on information inputted via the user terminal.

In another general aspect, this application describes, remote device including a processor, a communication interface and a memory. The communication interface is configured to access one of a plurality of available program applications stored in a computer. The one program application includes function for monitoring and control of an electronic device having embedded wireless data communication capabilities. The program application configures the remote device to execute the program application to communicate with the electronic device via the wireless data communication capabilities of the electronic device. The program application further includes functions to provide a user interface on the remote device to enable a user to view parameters of operation of the electronic device and to input a control command for transmission to the electronic device.

The UDR approach outlined above may offer one or more advantages, such as the following. The system allows the user remote terminal to function as the UDR for monitoring, configuring and/or control purposes with respect to the particular electronic device, e.g. to provide any necessary user interface capabilities. The wireless communications with the electronic device allow monitoring and/or control without the need for a local connection to a computer or the like to initiate communications for the device through the Internet. The user terminal device need not be dedicated to the particular electronic device but can be any device that can run the appropriately configured application. The UDR framework allows one program for the electronic device, e.g. uploaded from the device manufacturer, to be configured for a variety of different user terminal devices.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to systems and remote devices enabling a user to monitor and/or control an electronic device from the user remote terminal via wireless data communication with the electronic device. The technology may also facilitate monitoring and controlling of the data usage of the electronic device. As used herein, the term "monitoring" means to check, track or observe the various functions of the electronic device, including monitoring the data usage of the electronic device over the mobile service provider network and what applications are used by the electronic device. As used herein, the term "control" means to direct the electronic device to perform various functions or stop performing various functions. As used herein, "network communication" means communication through a distributed infrastructure.

Figure 1:
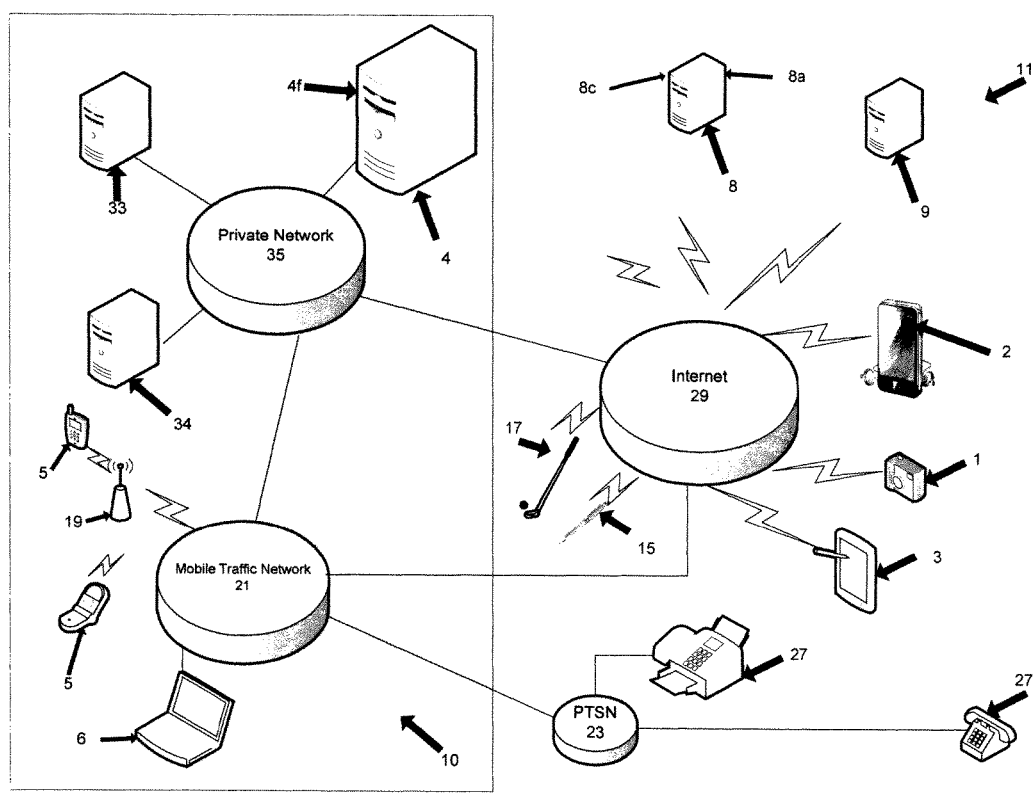
FIG. 1 illustrates a mobile communication network as may be operated by a carrier or service provider to provide a wide range of mobile communication services and ancillary services or features to its subscribers and associated mobile device users.

FIG. 1 shows a mobile communication network 10 as may be operated by a carrier or service provider to provide a wide range of mobile communication services and ancillary services or features to its subscribers and associated mobile device users. The elements generally indicated by the reference numeral 10 are elements of the network and are operated by or on behalf of the carrier, although the mobile devices typically are sold to the carrier's customers. The mobile communication network 10 provides communications between mobile devices, such as mobile phones and different servers within the mobile network, such as the UDR Proxy Server 4, as well as communications between the mobile devices and devices 11 outside the mobile communication network 10, such as electronic devices 1, 2, 3, and 17 and servers 8 and 9.

User terminals 5 and 6 appear in the drawing, to represent examples of the terminals. Terminal 5 may be a mobile device that may receive various services via the mobile communication network 10. Current examples of mobile devices include portable handsets, smart-phones, personal digital assistants, or tablets, although they may be implemented in other form factors.

The mobile communication network 10 typically is implemented by a number of interconnected networks. Hence, the overall network 10 may include a number of radio access networks ("RANs"), as well as regional ground networks interconnecting a number of RANs and a wide area network ("WAN") interconnecting the regional ground networks to core network elements. A regional portion of the network 10, such as that serving mobile device 5 will typically include one or more RANs and a regional circuit and/or packet switched network and associated signaling network facilities.

Physical elements of a RAN operated by one of the mobile service providers or carriers include a number of base stations represented in FIG. 1 by the base station ("BS") 19. Although not separately shown, such a base station 19 typically comprises a base transceiver system ("BTS") which communicates via an antennae system at the site of base station and over the air and link with one or more of the terminals 5 and 6 when the mobile devices are within range. Each base station typically includes a BTS coupled to several antennae mounted on a radio tower within a coverage area often referred to as a "cell." The BTS is the part of the radio network that sends and receives RF signals to/from the mobile devices that the base station currently serves.

The radio access networks also include a traffic network represented generally by the cloud at 21, which carries the user communications for the mobile devices 5 between the base station 19 and other elements with or through which the mobile devices 5 communicate. Individual elements such as switches and/or routers forming the mobile traffic network are omitted here form simplicity.

In the present disclosure, as discussed above, the cloud at 21 may be a mobile traffic network that connects to the private mobile network 35, which in turn communicates with the UDR Proxy Server 4. The traffic network portion 21 of the mobile communication network 10 also connects to a public switched telephone network ("PTSN") 23. This allows the network 10 to provide voice grade call connections between mobile devices 5 and regular telephones connected to the PSTN 23. The drawing shows one such telephone at 26.

The traffic network portion 21 of the mobile communication network 10 connects to a public packet switched data communication network, such as the network commonly referred to as the "Internet" shown at 29. Packet switched communications via the traffic network 21 and the Internet 29 may support a variety of user services through the network 10, such as mobile device communications of text and multimedia messages, e-mail, web surfing or browsing, programming and media downloading, etc. For example, the mobile devices may be able to receive messages from and send messages to user terminal devices, such as personal computers 6, either directly (peer-to-peer) or via various servers (not separately shown). FIG. 1 shows one such user terminal device as a personal computer ("PC") at 6, by way of example.

For purposes of discussing notifications, some notifications such as notification confirming that data usage restrictions of the electronic device have been successfully set may entail an e-mail message transmission of the notification to the user terminal, such as to the PC 6 via the Internet 29. In addition, some notifications such as confirmation that the subscriber data plan has changed or data usage limit has been reached may entail voice message delivery or even service representative calls to the account holder, for example, at a regular telephone such as telephone 26 via the PSTN 23. The PSTN 23 also provides connections to other types of customer premises equipment, such as facsimile or 'FAX' machines. FIG. 1 shows one FAX machine 27, by way of example.

The network 10 offers a variety of data services via the Internet 29, such as downloads, web browsing, e-mail, etc. In one particular example, as explained below, the network 10 enables a user of mobile device 5 to control and monitor an electronic device by accessing an application via the UDR Proxy Server 4 that accesses the application 8c on an Application Server 8 external to the mobile network through the Internet 29 via the private network 35. The UDR Proxy Server 4 provides the appropriate interface for the application to be viewed on the particular mobile device 5 based on the screen size, resolution, operating system and other parameters of the mobile device 5. For example, the UDR Framework 4f has style sheets and adjusts the screen sizes and configures the application 8a to be displayed on the UDR terminal 5.

The particular mobile device 5 may be referred to as the user UDR terminal.

FIG. 1 further illustrates a communication between a user UDR terminal, such as a mobile phone 5 or laptop computer 6 and exemplary electronic devices—camera 1, portable music player 2 and electronic reader (eReader) 3. At least for the UDR terminal 5, and possibly the UDR terminal 6, the communication occurs via the mobile traffic network 21, to which the UDR terminals 5 and 6 connect. The electronic devices 1, 2, 3, 15 and 17 have data communication capabilities, such as embedded wireless capabilities, which enable them to communicate through the Internet 29 with other devices in the network. The data communication for devices 1, 2, 3, 15 and 17 may be via the mobile network 21 or other communication links, e.g. WiFi hotspots.

In some examples the devices 1, 2, 3, 15 and 17 are electronic devices and are owned by the same person/group/entity. The devices 1, 2, 3, 15 and 17 are able to be separated by a large geographical distance. For example, the user and UDR terminal 5 may be in Washington. DC USA, the camera may be in Chicago, Ill. USA and the golf club 17 may be in Pebble Beach Calif., USA.

The mobile traffic network 21 is in communication with the private network 35, which in turn is in communication with the UDR Proxy Server 4. The UDR Proxy Server 4 acts as a proxy server for communication between the UDR terminals 5, 6, applications 8a on the Application Servers 8, and the electronic devices 1, 2 and 3. The UDR Proxy Server 4 includes a processor and a memory. The memory stores an application, which includes a component for monitoring and collecting data usage of the UDR terminals and electronic devices. The UDR Proxy Server 4 may also include a list of electronic devices available for control by the UDR terminal 5, 6 and information on how to identify these controllable electronic devices. Application Server 8, which is external to the network 10, also includes a processor and a memory. In addition, the memory of UDR Proxy Server 4 may also include an application framework component 4f from which a UDR terminal 5 may access an application 8a.

The Application Server 8 memory may store applications 8a for controlling one or more different types of electronic device 1, 2 and 3. The applications 8a residing in the Application Server 8 may be created by the manufacturer of one or more electronic devices 1-3 and/or by an independent third-party application developer. The UDR Proxy Server 4 may communicate with the Application Server 8 via the private network 35 and the Internet 29, to access the applications 8a stored on the server 8.

In one specific example, an application author such as the manufacturer of an electronic device 1 may create an application 8a that resides on Application Server 8. A UDR Application Framework component 4f stored in the memory of the UDR Proxy Server 4 may configure the application 8a stored on the Application Server 8 so that the application 8a is displayed and available for use on the UDR terminal 5, 6. For example, the application 8a residing on the Server 8 can be written in a standard open web language such as HTML, CSS and JavaScript. The UDR Framework 4f has style sheets and adjusts the screen sizes and configures the application 8a to be displayed on the UDR terminal 5.

In order to identify the interface of UDR terminals 5, 6, and configure the application 8a for use by the UDR terminals 5, 6, the UDR Proxy Server 4 may communicate with the UDR terminals 5, 6 via the private network 35 and mobile traffic network 21. During this communication between the UDR terminals 5, 6 and the UDR Proxy Sever 4, the UDR Proxy Server 4 identifies the UDR terminals 5, 6 interface.

The electronic devices 1, 2, 3, 15 and 17 may be identified by the UDR Proxy Server 4 and associated with a particular network subscriber using a UDR terminal 5, 6. The electronic device may be provided with a subscriber identification module (SIM) card. The SIM card securely stores the service-subscriber key (IMSI) used to identify the electronic device by the network provider. The SIM card may also include information identifying the network subscriber. The information identifying the network subscriber may include, for example, the account number and/or a name associated with network subscriber. The electronic device may communicate the IMSI and the information identifying the network subscriber stored on the SIM card to the UDR Proxy Server 4 via a wireless modem embedded in the electronic device. In this manner, the UDR Proxy Server 4 identifies the electronic device on the network and the network subscriber associated with the electronic device. The UDR Proxy Server 4 may also identify through a system of record, the mobile device associated with the network subscriber. For example, the UDR Proxy Server 4 may use the account number and the name of the network subscriber to identify the mobile device (e.g., the UDR terminal 5) associated with the network subscriber. In this manner, the UDR Proxy Server can pair up the electronic device with its corresponding UDR terminal.

In a slightly different implementation, instead of a SIM card informing the UDR Proxy Server 4 of the presence of the electronic device on the network, the user of the electronic device may provide this information. For example, the user of the electronic device 1 may provide the UDR Proxy Server 4 with the IMSI of the electronic device 1 and the subscriber information, so that the UDR Proxy Server 4 associates the subscriber with the electronic device 1. Alternatively, the user of the electronic device may provide the UDR Proxy Server 4 with the bar code or other product identifying code of the electronic device, which the UDR Proxy Server 4 may use to identify the electronic device. The subscriber information may include the account number and/or the user name. Additionally, the subscriber information may include information (e.g., MDN) associated with the user mobile device (e.g., the UDR terminal 1). Alternatively, the UDR Proxy Server 4 may glean this information from the system of record in a manner described above. The UDR Proxy Server 4 uses this information to associate the UDR terminal with the electronic device.

Once the UDR Proxy Server 4 has established an association between the UDR terminals 5, 6 and the electronic devices 1, 2 and 3, the UDR Proxy Server 4 may provide each of the users of the UDR terminals 5, 6 with a list of the electronic devices 1, 2, 3, 15 and 17 associated with the respective user. For example, the UDR Proxy Server 4 may display on the UDR terminal 5 that the electronic device 1 is detected on the network and associated with the user of the UDR terminal 5 and display on the UDR terminal 6 that the electronic devices 2, 3, 15 and 17 are detected on the network and associated with the user of the UDR terminal 6. The UDR Proxy Server 4 may transmit a list of the associated electronic devices 1, 2, 3, 15 and 17 in the form of an Internet Protocol communication, SMS message, multimedia message MMS or other type of message to the UDR terminal 5, 6. Alternatively, the user of the UDR terminal 5, 6 may open a user interface (e.g. browser type interface) by selecting an icon which connects the user to the UDR Proxy Server 4, and the UDR Proxy Server 4 may then display on the UDR terminal 5, 6, a list of the electronic devices 1, 2, 3, 15 and 17 associated with the subscriber.

The UDR Proxy Server 4 may identify which applications on Server 8 are available for monitoring, configuration and/or controlling the associated electronic devices 1, 2 and 3. The UDR Proxy Server 4 may transmit a list of these various applications in the same manner as the list of associated electronic devices 1, 2, 3, 15 and 17 described above were transmitted to the UDR terminal 5, 6. The applications may be accessed by UDR terminal 5, 6. The UDR Proxy Server 4 may also identify the data plan, data usage and other data information about the electronic device and applications.

The data usage of the electronic device may be saved a database stored on server 34 or 33 and accessed by and viewed on the UDR terminal 5, 6. The total data usage of the mobile network user account may be saved in a different database stored in the server 34 or 33 and the data usage may be itemized by device, file category (e.g. picture files, music files, internet), application. The data usage may be displayed on the UDR terminal 5, 6 in various forms, personalized by the user by instructing the UDR Proxy Server 4 to provide the requested data usage information retrieved from the various databases. For example, the data usage may be stored and/or displayed by file type, device, period of time, time of day, day, week and/or month.

To illustrate one specific example, the UDR Proxy Server 4 may identify the UDR terminal 5 to be associated with electronic device 1 and may further identify application 8a available on Server 8 for controlling and/or monitoring the electronic device 1. The user of the UDR terminal 5 may access the application 8a via the UDR Proxy Server 4. Prior to accessing the application, the UDR framework 4f may identify the interface of the UDR terminal 5 and may configure the application 8a for display on the UDR terminal 5 if necessary.

Alternatively, the user of the UDR terminal 5 may access the application 8a residing in the Server 8 by selecting an icon that allows the user to connect to the Server 8. In either case, the user of the UDR terminal 5 may use the application 8a to send control and/or monitoring commands to the electronic device 1. The UDR Proxy Server 4 acts as a proxy, for the UDR terminal 5 to link to the application 8a.

In keeping with the previous example, the user of the UDR terminal 5 may purchase an amount of data from the network and designate how much data the electronic device 1 is allowed to use for a certain period of time. This information may be communicated automatically by the electronic device 1 or UDR terminal 5 to the UDR Proxy Server 4 when the data is purchased or by the user of the UDR terminal 5 to the UDR Proxy Server 4 and stored on a server 33 or 34. The UDR Proxy Server 4 monitors data usage and may restrict communication between the electronic device 1 and the UDR terminal 5 based on the amount of data usage designated by the user of the UDR terminal 5 for the electronic device 1 over a particular period of time.

When the data amount has been reached, the UDR Proxy Server 4 may restrict communication between the electronic device 1 and the UDR terminal 5 by not allowing any data to be transferred between the two devices. Prior to restricting communication, the UDR Proxy Server 4 may provide warnings via a message sent the UDR terminal 5 when the amount of data used is close to the designated data amount limit. For example, the warnings may be based on standard intervals of 50%, 75% and 90% of the data amount limit or may be customized by the user. The warning message may include the amount of data left and may be tailored to the type of electronic device, e.g. if the device is a camera, the warning will provide the approximate number of pictures or length of video that can be sent given the particular characteristics of the camera (e.g., resolution). Thus, in tailoring the warning to the type of electronic device, the warning may also be tailored to the type of data usage available by using the electronic device.

When the UDR Proxy Server 4 receives commands from the UDR terminal 5 to control and/or monitor such data usage for electronic device 1, the UDR Proxy Server 4 compares the amount of data used by the electronic device 1 for the particular period of time, as stored on a server, with the amount of data designated for the electronic device 1 by the user of the UDR terminal 5 as stored on a server such as 33 or 34. If the data usage of the electronic device 1 is less than the designated amount, the UDR Proxy Server 4 allows communication between the UDR terminal 5 and the electronic device 1 to proceed via the application stored on the Server 8. However, if the data usage of the electronic device 1 is equal to or greater than the designated amount, the UDR Proxy Server 4 may inform the user of the UDR terminal 5 that the designated amount of data by the electronic device 1 has been reached and may not allow further communication between the UDR terminal 5 and the electronic device 1. Although the example has been described with respect to only the electronic device 1, one of ordinary skill in the art recognizes that it can be applied to other electronic devices that may be associated with the UDR terminal 5. This way, the user of the UDR terminal 5 can control the amount of data usage for each of its associative electronic devices.

The memory of the UDR Proxy Server 4 may store data usage parameters provided by the manufacturer of the electronic device. The data usage may be purchased by the manufacturers of the electronic devices or the applications via an Open Data Marketplace Exchange (ODME) web portal residing on a server, such as server 33. The ODME web portal allows subscribes to interact with each other and offer and exchange business models and services.

The ODME is a business to business (B2B) platform that allows companies to purchase data in bulk from a network provider and create alternative data plans (ADPs) that the company can resell or offer for free to customers through the UDR accessed applications. The ODME allows companies who have purchased data transport from the network provider to share that data transport with another company or to combine it with multiple companies. For example, an electronics store and a picture sharing website each purchase data transport bundles from the network provider, they may combine a portion of the respective data transport bundles together to create an alternative data plan for a particular brand of camera sold at the electronics store.

To illustrate one specific example, the manufacturer of a digital camera 1 accesses the ODME web portal from a computer and purchases 50 MB of data for a photo-sharing website company, for use by the digital camera 1. This information regarding the amount of data is identified in the memory of the UDR Proxy Server 4. When the UDR Proxy Server 4 receives commands from the UDR terminal 5 to control or monitor the data usage of the camera 1, the UDR Proxy Server 4 compares the amount of data used by the digital camera 1 as stored on a server 33, with the amount of data identified on the UDR Proxy Server 4 (50 MB). If the data usage of the digital camera 1 is less than 50 MB, the UDR Proxy Server 4 allows communication between the UDR terminal 5 and the digital camera 1 via the application 8a to proceed. However, if the data usage of the digital camera 1 is equal to or greater than 50 MB, the UDR Proxy Server 4 informs the user of the UDR terminal 5 and/or the camera 1 that the designated amount of data by the digital camera has been reached and may not allow further communication between the UDR terminal 5 and the digital camera 1 until more data is purchased. In this example, if the picture file to be sent between the UDR terminal 5 and the digital camera is 80 KB, then the user may be given the option of buying more data. The UDR Application Framework 4f may provide the manufacture of the application rules and specification for how data is measured such as by file size. The data size of the file to be transferred may be identified by the electronic device prior to attempting to transfer the data from the electronic device, such as the digital camera 1.

Securely verified and confirmed corporations, such as manufacturers of the electronic devices may log into the ODME portal and search for different Data Transport Packages that can be bought from the network provider. Data transport may be purchased in bundles based on amount of transport, time, duration and time of day. The quality of service (QoS) and transport speed may be added as an extra feature to Data Transport bundles. Corporations, such as manufacturers of the electronic devices may also search for other companies that have purchased data transport and are looking for partners, to help lower their costs or for some other strategic reason. Searches within the ODME may be done based on company type, segmentation, time frame or a combination of criteria. In addition, subscribers may purchase data package plans from the network provider and assign data usage amounts for each electronic device.

Registered companies that have access to the ODME may also submit applications that other companies can access through network.

EXAMPLES

A user may utilize the UDR Application Framework 4f to share pictures, stored on the memory of the camera 1, with friends by posting the pictures on a photo-sharing website. The user accomplishes this by turning on the camera 1 having the embedded wireless connection and the SIM card. The identifying information on the SIM card is sent to the UDR Proxy Server 4 via the embedded wireless connection. This may be done automatically each time the camera 1 turns on or accesses the mobile wireless network or when manually activated by the user of the camera 1. Alternatively, instead of using a SIM card, the user may provide the bar code or other device identifying information to the UDR Proxy Server 4. The UDR Proxy Server 4 may use the identifying information to identify the electronic device 1 on the network. The UDR Proxy Server 4 may also utilize the identifying information to identify a UDR terminal associated with the electronic device 1. The manner in which the UDR Proxy Server 4 associates the electronic device 1 with its corresponding UDR terminal (e.g., the UDR terminal 5) was discussed above and is not discussed here for the sake of brevity.

Upon identifying the UDR terminal 5, the UDR Proxy Server 4 notifies the user of the UDR terminal 5 that the camera 1 is available for control and monitoring using the UDR terminal 5. The UDR Application Framework 4f also provides the user with a list of applications available for use for controlling and monitoring the camera 1. In keeping with the previous example, the list may include the application 8a that has been configured by the UDR framework 4f for use by the UDR terminal 5 to control and monitor the camera 1.

In one implementation, the manufacturer of the camera 1 creates the application 8a which is stored on a server 8. In another implementation, the third-party developer independent of the manufacturer of the camera 1 creates the application 8a for camera 1. In either case, the application 8a may be accessed by the UDR terminal 5 via the mobile traffic network 21, private network 35, UDR Proxy Server 4 and Internet 29. The application 8a may be configured to allow pictures stored in the memory of the camera 1 to be posted to a website stored on a server 9. The application 8a may be a plug-in.

As noted above, the UDR Framework 4f configures the application 8a for use by a particular UDR terminal associated with the camera 1. In keeping with the previous example, the UDR terminal includes the UDR terminal 5. The user may use the UDR terminal 5 to access the application 8a to this end, the UDR Proxy Server 4 stores a link to the application 8a on the UDR Application Framework 4f for access by the UDR terminal 5, the activation of which allows the user to access the application 8a.

The user configures and controls the camera 1 using the application 8a and monitors data usage using the UDR Proxy Server 4. The application 8a may be used to send commands to the camera 1 for uploading pictures stored on the camera 1 to a website stored on server 9. The camera 1 then sends the picture files to the web site server 9 via the Internet 29.

The UDR Proxy Server 4 may verify that the user has sufficient data usage rights to communicate with the camera 1 via the UDR terminal 5 by comparing the amount of data used by the camera 1 for a particular period of time, as stored on a server, such as server 33 or 34, with the amount of data designated for the camera as stored on a server such as 33 or 34. The UDR Proxy Server 4 may store programming in its memory in the form of an application that shows the user information data usage for each electronic device including the camera and other user data usage information. The application may allow the user to purchase more data, change data plans or designate changes in data usage restrictions for the camera. If the user does not have sufficient data usage rights or during use exceeds the data usage rights, the UDR Proxy Server 4 may notify the user via the application that data use has been exceeded and the UDR Proxy Server 4 may terminate communication between the camera 1 and the UDR terminal 5.

As another example, a user may utilize the UDR Proxy Server 4 to create play lists on a portable music player 2 using the UDR terminal 5. To this end, the application 8a may be configured to allow music files stored in the memory of the portable music player 2 to be edited remotely by a UDR terminal 5. In one implementation, the manufacturer of the portable music player 2 creates the application 8a. In another implementation, the third-party developer independent of the manufacturer of the portable music player 2 creates the application 8a. Similar to the previous example, the application 8a may be a plug-in and the user may monitor and control data usage of the portable music player using the UDR Proxy Server 4 application.

As noted above, the UDR Application Framework 4f configures the application 8a so that the application is in an appropriate form for use by a particular UDR terminal 5 associated with the portable music player 2. The user may use the UDR terminal 5 to access and use the application 8a from the UDR Proxy Server 4.

The user controls the portable music player 2 using the application 8a. The application 8a may be used to send commands to the portable music player 2 via the UDR Proxy Server 4 for creating playlists of songs stored on the portable music player 2. The portable music player 2 creates the playlists of songs as instructed and stores the playlist in the portable music player 2. The UDR Proxy Server 4 may verify that the user has sufficient data usage rights to communicate with the portable music player 2 via the UDR terminal 5 by comparing the amount of data used by the portable music player 2 for a particular period of time, as stored on a server, such as server 33 or 34, with the amount of data designated for the portable music player 2 as stored on a server such as 33 or 34. If the user does not have sufficient data usage rights or during use exceeds the data usage rights, the UDR Proxy Server 4 may terminate the communication between the portable music player 2 and the UDR terminal 5.

As another example, a user may utilize the UDR Proxy Server 4 to monitor usage and control when and how books and other periodicals are downloaded to an Electronic Reader (eReader) 3. Similar to the previous scenarios, the manufacture of the eReader 3 or a third-party developer may prepare an application 8a that allows the user to view how many books or other periodicals they have consumed using the UDR terminal 5.

As another example, a user may utilize the UDR Proxy Server 4 to monitor usage and control data recorded by a digital pen 15 that records information the user of the digital pen 15 writes on any surface. The digital pen is able to record the information and save the information to a remote server for later use. Similar to the previous scenarios, the manufacture of the digital pen 15 or a third-party developer may prepare an application 8a that allows the user to view how much recorded data they have consumed using the UDR terminal 5.

As another example, a user may utilize the UDR Proxy Server 4 to monitor usage and control data recorded by a digital golf club 17 that records every swing the user makes with GPS and is able to record it. The golf club is able to record the information and save the information to a remote server for later use. Similar to the previous scenarios, the manufacture of the digital golf club 17 or a third-party developer may prepare an application 8a that allows the user to view how much recorded data they have consumed using the UDR terminal 5.

Figure 2:
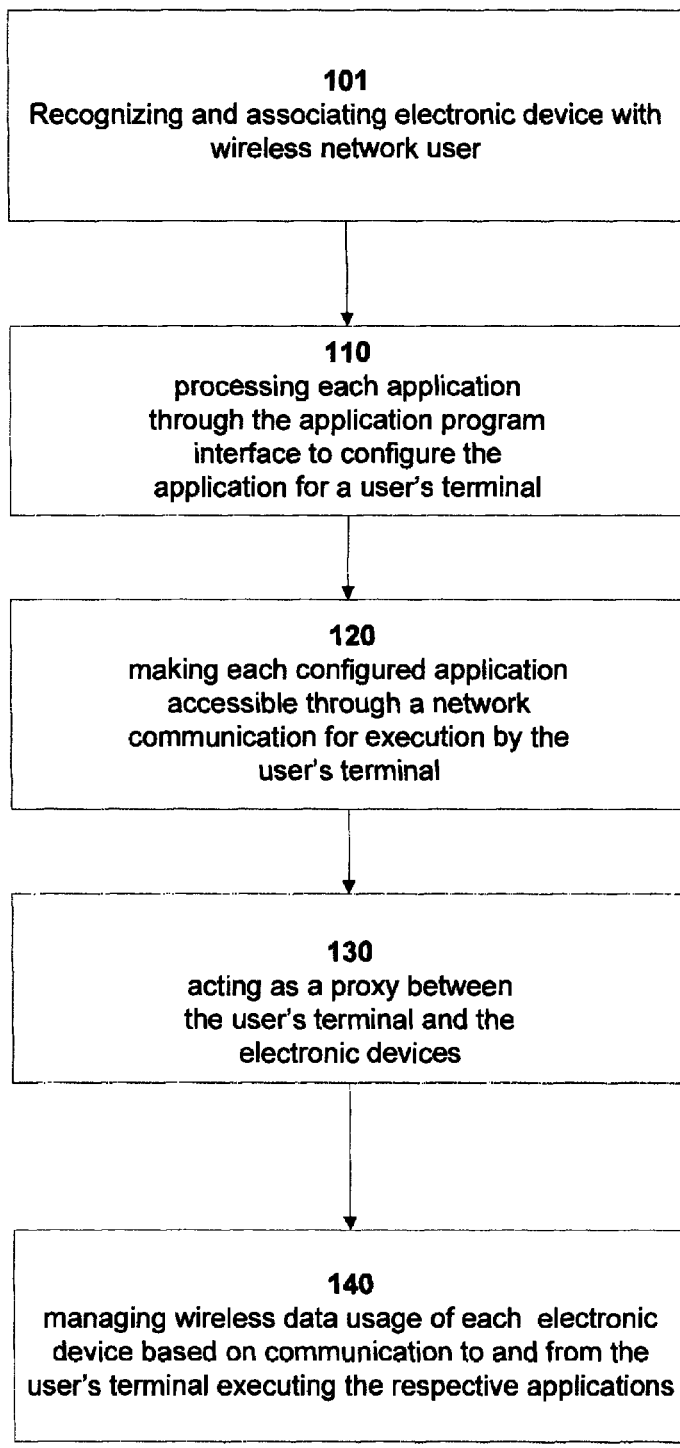
FIG. 2 illustrates an exemplary process for remotely monitoring and/or controlling an electronic device in the network of FIG. 1.

FIG. 2 illustrates an exemplary process for remotely monitoring and/or controlling an electronic device in the network of FIG. 1. The process may begin with recognizing an electronic device 1 and associating the electronic device with a user of a wireless network by providing identifying information of the electronic device 1, 2, 3, 15, 17 to the UDR Proxy Server 4 via the UDR terminal 5 and providing the UDR Proxy Server 4 with user identifying information. (Step 101).

The process further involves accessing a plurality of applications (e.g., application 8a) (Step 110). The plurality of applications may include an application for controlling the selection of photographs stored on a digital camera, an application for controlling the selection of text and image files recorded by a digital pen, an application for controlling the selection of data files recorded by a digital golf club, and an application for controlling the songs stored on a portable music player. The applications may be created by the manufacturer of the particular electronic device and reside on a server 8. Alternatively or additionally, the applications may be created by a third-party developer independent of the manufacturer of the particular electronic device.

The process also involves configuring each respective application by the UDR Application Framework 4f, to configure the respective application for use on a particular UDR terminal used to remotely control, configure and/or monitor the one or more electronic devices (Step 120).

The UDR Proxy Server 4 acts as a proxy between the UDR terminal and the electronic devices to allow the UDR terminal to wirelessly monitor and/or control the respective electronic devices (Step 130). The user utilizes the application to send commands to the electronic device.

The process may also include managing the data usage of the respective electronic devices with the UDR terminal (Step 140). Each electronic device may be identified and associated with an amount of data usage. The amount of data usage assigned to the electronic device may be purchased by either the subscriber or manufacturer of the electronic device or application. For example, the user of the UDR terminal may purchase an amount of data from the network, manufacturer of the device, retailer, or web site provider, and designate how much data the electronic device is allowed to use for a certain period of time.

In addition or alternatively, the user may partition data usage (i.e., restrict data usage and designate a maximum amount of data usage) on the basis of data type, (for example image files, media files, text files); device, device type (for example digital camera, eReader, digital pen, digital golf club, portable music player); user (for example adult or child); time of day or week (for example weekdays, weekends, daytime, evening); application, by multiple user accounts or other categories. The user may also redistribute the designated maximum amount of data usage among the aforementioned data types, devices, users, time, accounts and other categories, based on data type, device, device type, user, time of day or week, subscriber account or other categories. This information regarding the partitioning and redistribution of data and the actual data used by each device, user, time when used, type of data and/or type of application may be communicated by the user of the UDR terminal to the UDR Proxy Server 4 by inputting this information for controlling the data usage of the device using the input of the UDR terminal such as a keypad or touch screen or other input interface and may be stored in a server 33 or 34 and accessed from the UDR Proxy Server 4 in the form of an application on the UDR terminal 5, 6. Applications may access servers 33 and 34 via the UDR Proxy Server 4 to obtain data usage information by data usage by user, electronic device, file type and/or time and display data usage on UDR terminals 5, 6 by user, electronic device, file type and/or time.

The UDR Proxy Server 4 may restrict communication and data transfer between the electronic device and the UDR terminal based on the amount of data usage designated by the user of the UDR terminal as described above in reference to various basis for partitioning of data usage. In addition to purchasing more data, the data usage application accessed from the UDR Proxy Server 4 by the UDR terminal may also allow the user to control how and how much data is used.

When the UDR terminal is used to control or monitor an associated electronic device, the UDR Proxy Server 4 compares the amount of data used by the electronic device for a particular period of time with the amount of data designated for the electronic device by the user of the UDR terminal. If the data usage of the electronic device is equal to or greater than the amount of data designated for the electronic device, the UDR Proxy Server 4 informs via the UDR Proxy Server 4 data usage application that that the designated amount of data by the electronic device has been reached.

The UDR Proxy Server 4 verifies the amount of data usage assigned to the electronic device, this information is stored on a server, such as server 33 or 34. As the electronic device sends and receives data via the network 10, the UDR Proxy Server 4, monitors the amount of remaining data for each electronic device of the amount of data assigned to the electronic device.

The UDR Proxy Sever 4 allows the UDR terminal to communicate with the electronic device if the electronic device has a sufficient amount of remaining data usage. The amount of data usage used and the amount of data remaining for each electronic device may be monitored by a network server, such as servers 34 and 33. This data usage may be provided to the UDR terminal via the private network 35. The user of the UDR terminal may purchase more data for each electronic device and restrict the timings of use of data communication of the electronic device using the electronic device or a different device. To this end, the user of the UDR terminal may access an application 8a from the UDR Proxy Server 4 that is configured to display details about data usage for each of the subscriber's electronic devices and the amount of data allowed in the subscriber's wireless plan.

From the UDR terminal, the user may set the data usage of each electronic device. For example, the user may specify when the device can connect to the Internet and which UDR terminal user can access the electronic device. The settings may be saved on the UDR Proxy Server 4, which restricts the electronic devices from connecting to the server based on the settings set by the subscriber. For example, in a family, two parents would like to restrict data usage of their three children to 50 MB each and only between the hours of 8 PM to 10 PM on weeknights and anytime on weekends. The parents access on their mobile device 5 an application 8a that shows the data usage of each electronic device having embedded wireless capabilities. Using an application on their UDR terminal, the parents set the data usage and time restrictions on each child and on each electronic device and the settings are stored on the UDR Proxy Server 4. The application 8a may require a parental identification key (e.g., password) so that the restrictions can only be reset by the parents.

Hence, aspects of the methods of enabling a mobile device user to conduct transaction via a mobile network messaging service may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of server 4 and/or from server 4 to the mobile device 5 or the personal computer 6. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Figure 3:
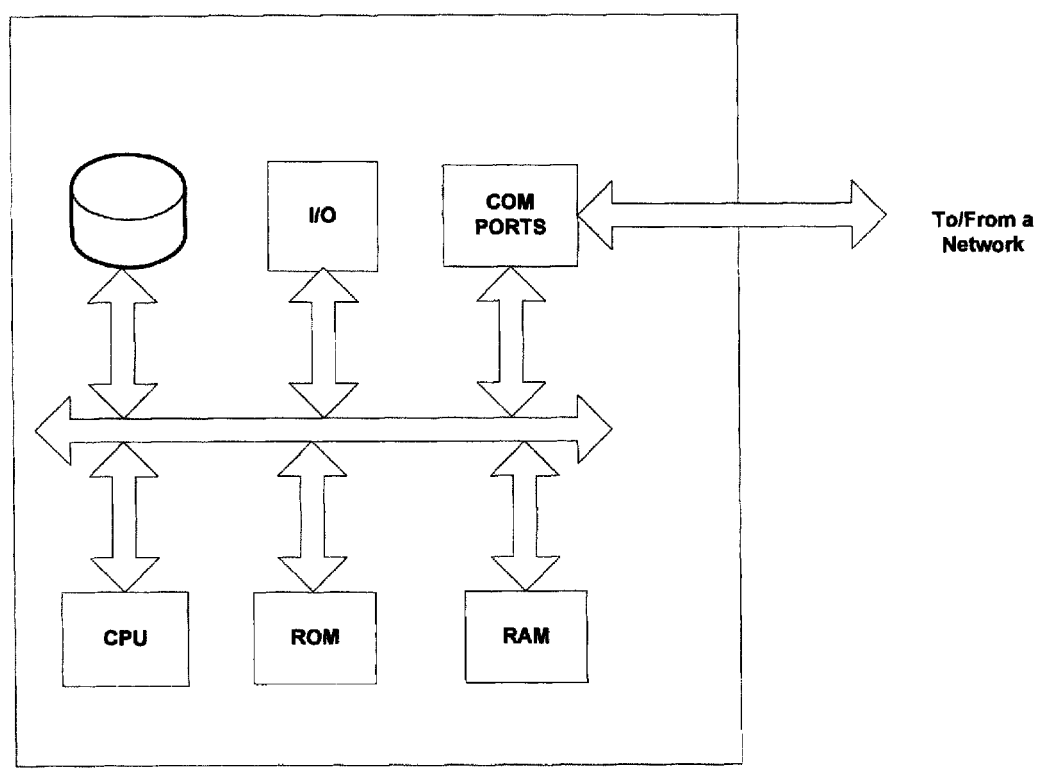
FIG. 3 is a simplified functional block diagram of a computer that may be configured as a host or server, for example, to function as a UDR Proxy Server in the network of FIG. 1.
Figure 4:
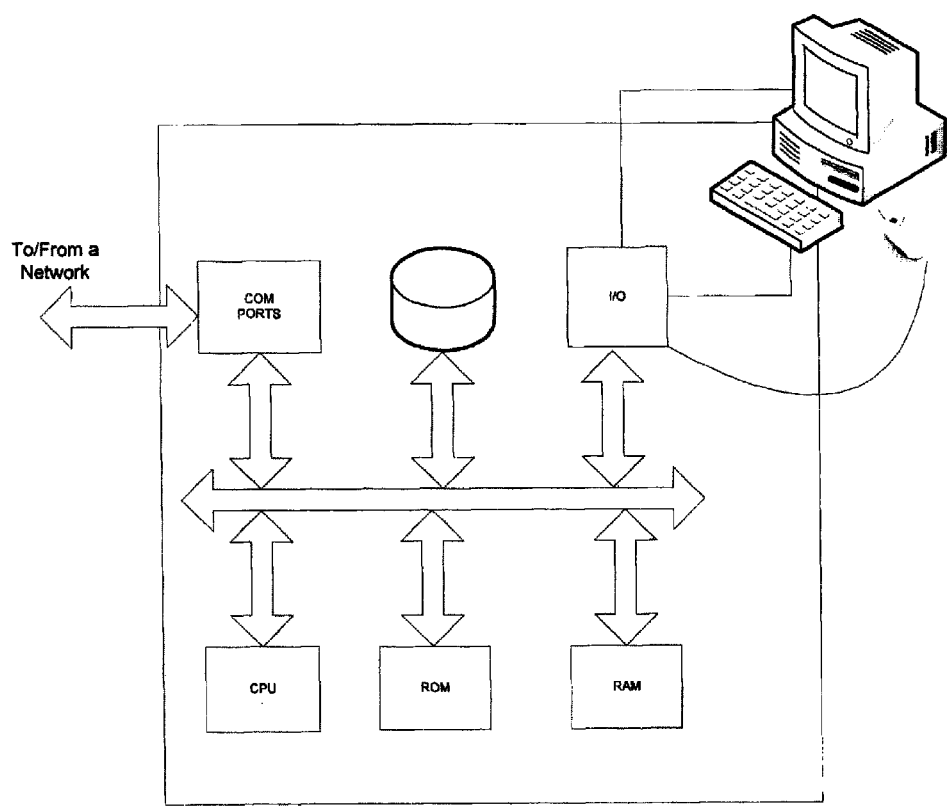
FIG. 4 is a simplified functional block diagram of a personal computer or other work station or terminal device.

FIGS. 3 and 4 provide functional block diagram illustrations of general purpose computer hardware platforms. FIG. 3 illustrates a network or host computer platform, as may typically be used to implement a server like the UDR Proxy Server 4. FIG. 3 depicts a computer with user interface elements, as may be used to implement a personal computer or other type of work station or terminal device, although the computer of FIG. 3 may also act as a server if appropriately programmed. It is believed that those skilled in the art are familiar with the structure, programming and general operation of such computer equipment and as a result the drawings should be self-explanatory.

A platform for a server or the like, for example, includes a data communication interface for packet data communication. The platform also includes a central processing unit (CPU), in the form of one or more processors, for executing program instructions. The platform typically includes an internal communication bus, program storage and data storage for various data files to be processed and/or communicated by the platform, although the server often receives programming and data via network communications. The hardware elements, operating systems and programming languages of such equipment are conventional in nature, and it is presumed that those skilled in the art are adequately familiar therewith. Of course, the UDR Proxy Server and/or other server functions may be implemented in a distributed fashion on a number of similar platforms, to distribute the processing load.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the to automatically providing directions on a mobile station of a customer at a first store to the location of a second store that has a desired product not available in the first store as shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for remotely controlling an electronic device, the method comprising the steps of:
  remotely accessing, from a user terminal and through a communication network one application from among a plurality of program applications, each respective application relating to monitoring and controlling a respective electronic device having embedded wireless data communication capabilities;
  configuring, from the user terminal, the one application for execution by the user terminal, designated as a universal data remote (UDR) with respect to the electronic device, to enable the user terminal to control or monitor the electronic device via wireless data communication; and
  controlling, using the one application accessed from the user terminal, a network server remotely located from the electronic device to monitor and restrict data usage of the electronic device responsive to control inputs via the user terminal, wherein:
  the control inputs comprise designating a maximum amount of data usage rights available to communicate with the electronic device via the user terminal over a period of time, and
  upon receiving a network data access request for the electronic device, the user terminal allows the network server to determine, based on the control inputs, whether to grant the network data access request
  providing a warning when the usage data of the electronic device is within a predetermined range of the designated maximum amount of data usage rights available to communicate with the electronic device.

2. The method of claim 1, wherein the electronic device comprises a service-subscriber key.

3. The method of claim 1, further comprising the step of restricting data usage by the electronic device when the electronic device is within a predetermined range of the designated maximum amount of data usage rights.

4. The method of claim 1, further comprising the step of allowing the purchase of additional data to increase the maximum amount of data usage rights.

5. The method of claim 1, further comprising at least one of monitoring the actual data usage or redistributing the maximum amount of data usage rights among the electronic device and other electronic devices that share the maximum amount of data usage rights.

6. The method of claim 1, further comprising storing information regarding data usage for the electronic device.

7. The method of claim 6, further comprising displaying the data usage information on the user terminal such that the data usage is categorized by at least one of: device, file type, time of day, and day of week.

8. The method of claim 1, wherein the program applications control different mobile electronic devices.

9. The method of claim 1, further comprising the steps of:
  accessing through the communication network a second application for monitoring and controlling a second electronic device having embedded wireless data communication capabilities; and
  configuring the second application for the user terminal designated as a UDR with respect to the second electronic device, for execution to enable the user to control or monitor the second electronic device from the user terminal via wireless data communication with the second electronic device.

10. The method of claim 9, further comprising controlling data usage of the second electronic device responsive to control inputs via the user terminal.

11. The method of claim 10, wherein the control inputs comprise designating a maximum amount of data usage rights to be distributed among the first and second electronic devices over a predetermined period of time.

12. The method of claim 11, further comprising providing a warning when data usage of the second electronic device is within a predetermined range of the designated maximum amount of data usage rights of the second electronic device.

13. The method of claim 11, further comprising restricting data usage by the second electronic device when the second electronic device is within a predetermined range of the designated maximum amount of data usage rights.

14. The method of claim 1, further comprising:
  receiving, from the network server monitoring data usage of the electronic device, information on an amount of data usage used by the electronic device; and
  providing, in the one application executed by the user terminal, the received information on the amount of data usage used by the electronic device.

15. A remote device comprising:
  a processor, a communication interface and a memory, wherein the communication interface is configured by the processor to access one program application from among a plurality of available program applications stored in a computer, and store the program application in the memory, the program application including:
  functions for monitoring and control of an electronic device having embedded wireless data communication capabilities,
  wherein the program application configures the remote device to:
  communicate with the electronic device, via the wireless data communication capabilities of the electronic device,
  provide a user interface on the remote device to enable a user to view parameters of operation of the electronic device and to input a control command for transmission to the electronic device, and
  control, using the program application accessed from the remote device, a network server to monitor and restrict data usage of the electronic device responsive to the control command, wherein:
  the control command includes designating a maximum amount of data usage rights available to communicate with the electronic device over a period of time,
  the network server is different from the electronic device, and
  upon receiving a network data access request for the electronic device, the remote device allows the network server to determine, based on the control inputs, whether to grant the network data access request;

provide a warning when the data usage of the electronic device is within a predetermined range of the designated maximum amount of data usage rights available to communicate with the electronic device.

16. The remote device of claim 15, wherein the program application is a plug-in.

17. The remote device of claim 16, wherein the plug-in is uploaded from the manufacturer of the electronic device and configured by a UDR framework for execution on a specific terminal implementation of the remote device.

18. The remote device of claim 15, wherein the program application further configures the remote device to:

receive, from the network server monitoring data usage of the electronic device, information on an amount of data usage used by the electronic device; and provide, in the user interface on the remote device, the received information on the amount of data usage used by the electronic device.

* * * * *